(12) United States Patent
Klug et al.

(10) Patent No.: US 6,419,718 B1
(45) Date of Patent: Jul. 16, 2002

(54) COVER MEMBER AND AIR CLEANER CONSTRUCTION; USE; AND, METHOD OF ASSEMBLY

(75) Inventors: Jerry John Klug, Rosemount; William Michael Nyman, Eagan; Bruce Allen Boehrs, Minneapolis, all of MN (US)

(73) Assignee: Donaldson Company, Inc., Minneapolis, MN (US)

( * ) Notice: Subject to any disclaimer, the term of this patent is extended or adjusted under 35 U.S.C. 154(b) by 62 days.

(21) Appl. No.: 09/687,825

(22) Filed: Oct. 13, 2000

(51) Int. Cl.[7] ............................................. B01D 46/00
(52) U.S. Cl. ........................... 55/320; 55/428; 55/498; 55/502; 55/503; 55/504
(58) Field of Search .......................... 55/498, 502, 503, 55/504, 320, 428

(56) References Cited

U.S. PATENT DOCUMENTS

| | | |
|---|---|---|
| 1,898,027 A | 2/1933 | Winslow |
| 2,463,722 A | 3/1949 | Spraragen |
| 2,675,886 A | 4/1954 | McMullen |
| 2,959,248 A | 11/1960 | Thornburgh |
| 2,962,121 A | 11/1960 | Wilber |
| 2,966,960 A | 1/1961 | Rochlin |
| 3,078,650 A | 2/1963 | Anderson et al. |
| 3,123,456 A | 3/1964 | Boltz et al. |
| 3,130,025 A | 4/1964 | Bowden et al. |
| 3,137,553 A | 6/1964 | Billey et al. |
| 3,147,100 A | 9/1964 | Wilber |
| 3,218,785 A | 11/1965 | Tietz |
| 3,399,515 A | 9/1968 | Hahl |
| 3,419,892 A | 12/1968 | Wagner et al. |
| 3,429,108 A | 2/1969 | Larson |
| 3,508,383 A | 4/1970 | Humbert, Jr. et al. |
| 3,584,439 A * | 6/1971 | Gronholz |
| 3,616,618 A | 11/1971 | Gronholz et al. |
| 3,672,130 A | 6/1972 | Sullivan et al. |
| 3,672,464 A | 6/1972 | Rowley et al. |
| 3,680,286 A | 8/1972 | Nostrand et al. |
| 3,785,129 A | 1/1974 | Szmutko |
| 3,918,942 A | 11/1975 | Rechtsteiner et al. |
| 4,122,914 A | 10/1978 | Suyama |
| 4,135,899 A | 1/1979 | Gauer |
| 4,227,899 A | 10/1980 | Meny et al. |
| 4,235,611 A * | 11/1980 | Brownell |
| 4,243,397 A * | 1/1981 | Tokar et al. |
| 4,267,899 A | 5/1981 | Wagner et al. |
| 4,278,455 A * | 7/1981 | Nardi |
| 4,325,460 A | 4/1982 | Hoppenstedt |
| 4,350,509 A | 9/1982 | Alseth et al. |
| 4,353,434 A | 10/1982 | Norris |
| 4,359,135 A | 11/1982 | Wagner et al. |
| 4,368,799 A | 1/1983 | Wagner |
| 4,580,657 A | 4/1986 | Schmeichel et al. |
| 4,632,216 A | 12/1986 | Wagner et al. |
| 4,950,317 A * | 8/1990 | Dottermans |
| 4,969,537 A | 11/1990 | Wagner et al. |
| 5,112,372 A | 5/1992 | Boeckermann et al. |
| 5,171,342 A * | 12/1992 | Trefz |
| 5,484,466 A | 1/1996 | Brown et al. |
| 5,545,241 A | 8/1996 | Vanderauwera et al. |
| 5,547,480 A * | 8/1996 | Coulonvaux |
| 5,685,985 A | 11/1997 | Brown et al. |
| 5,702,602 A * | 12/1997 | Brown et al. |
| 5,730,769 A | 3/1998 | Dungs et al. |
| 5,753,117 A * | 5/1998 | Jiang |

(List continued on next page.)

FOREIGN PATENT DOCUMENTS

| | | |
|---|---|---|
| DE | 33 33 621 A1 | 4/1985 |
| DE | 197 12 679 A1 | 10/1998 |
| EP | 0 676 228 A1 | 10/1995 |
| EP | 0 942 167 A2 | 9/1999 |

*Primary Examiner*—Duane S. Smith
(74) *Attorney, Agent, or Firm*—Merchant & Gould P.C.

(57) ABSTRACT

An air cleaner assembly is provided. The air cleaner assembly includes preferred one-piece cover/filter element construction. A method for manufacturing a preferred cover assembly with a filter element construction nondetachably secured thereto, is provided.

20 Claims, 12 Drawing Sheets

U.S. PATENT DOCUMENTS

| | | | |
|---|---|---|---|
| 5,755,842 A | * | 5/1998 | Patel et al. |
| 5,755,843 A | * | 5/1998 | Sundquist |
| 5,762,669 A | | 6/1998 | Kahlbaugh et al. |
| 5,800,581 A | | 9/1998 | Gielink et al. |
| 5,863,313 A | | 1/1999 | Coulonvaux |
| 5,893,937 A | * | 4/1999 | Moessinger |
| 5,938,804 A | | 8/1999 | Engel et al. |
| B15,545,241 A | | 9/1999 | Vanderauwera et al. |
| 6,022,055 A | | 2/2000 | Coulonvaux et al. |
| 6,039,778 A | * | 3/2000 | Coulonvaux |
| 6,051,042 A | | 4/2000 | Coulonvaux |
| 6,093,237 A | | 7/2000 | Keller et al. |
| 6,139,607 A | * | 10/2000 | Coulonvaux |
| 6,306,192 B1 | * | 10/2001 | Greif et al. |
| 6,344,887 B1 | * | 1/2002 | Coulonvaux |

* cited by examiner

COVER MEMBER AND AIR CLEANER CONSTRUCTION; USE; AND, METHOD OF ASSEMBLY

BACKGROUND OF THE INVENTION

FIELD OF THE INVENTION

The present invention relates to air cleaners. In one particularly advantageous application, it concerns air cleaners for cleaning engine combustion intake air, for internal combustion engines. The invention particularly concerns a preferred cover member for use in an air cleaner assembly.

BACKGROUND

Internal combustion engines are generally provided in machinery, with an air cleaner arranged and positioned to filter air as it is directed from the ambient environment into the engine air intake, for combustion; or, to filter air for some other purposes for example compression. A wide variety of air cleaner systems are known. In many of these systems, a portion of the air cleaner which includes the filter media is constructed and arranged as a service part for removal and refurbishing or replacement. In general, replacement is periodically necessary since, in time, the filter media will become occluded with particulate material as a result of the filtering function.

During replacement, it is important to ensure the integrity of the filter element and to install the new element with generation of appropriate sealing to ensure protection of the engine against unfiltered ambient air reaching the engine air intake.

It is desirable that the air cleaner be designed such that the filter element can be removed and replaced in a convenient manner; and, also, it is preferable that the air cleaner be such that the filter element can be readily manufactured in a relatively low cost manner.

SUMMARY OF THE INVENTION

A one piece cover and filter element construction, i.e., cover member or assembly, useable in an air cleaner arrangement, is provided. The one piece cover and element construction includes a filter element construction nondetachably connected to (secured to) a cover wall member. Preferably, a composite arrangement for the cover member is used, including a preformed shroud construction secured to a preformed outer wall member. According to the present disclosure, a preferred method of assembly of such a cover member is provided. Also a preferred air cleaner assembly, including a preferred cover member, is provided.

BRIEF DESCRIPTION OF THE DRAWINGS

in FIG. 7 including a portion depicted in cross section;

in FIG. 8 a portion of the combination component being depicted in cross-sectional view;

DETAILED DESCRIPTION

A. The Overall Assembly

Figure 1:
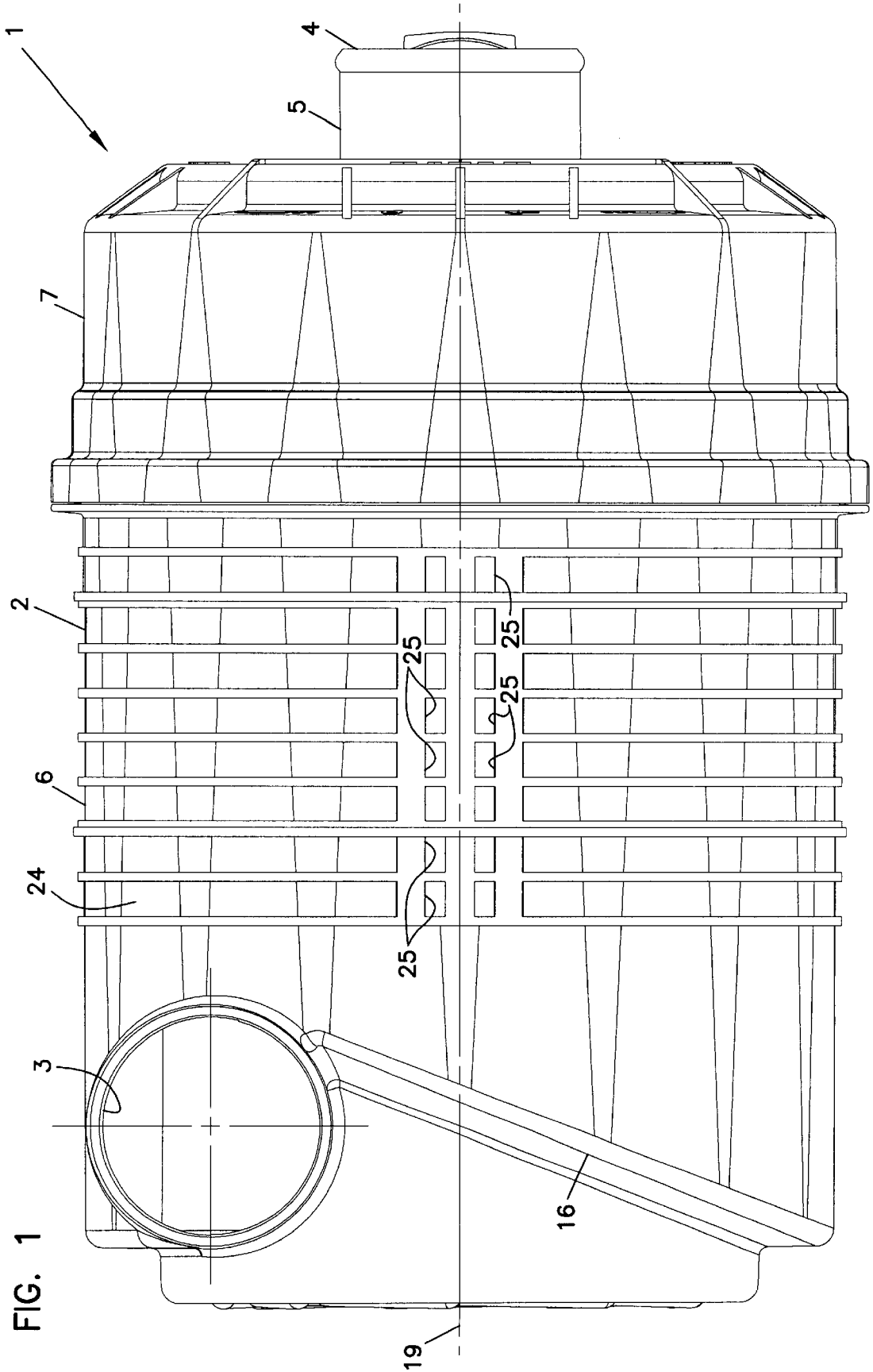
FIG. 1 is a top plan view of an air cleaner assembly according to the present invention.
Figure 2:
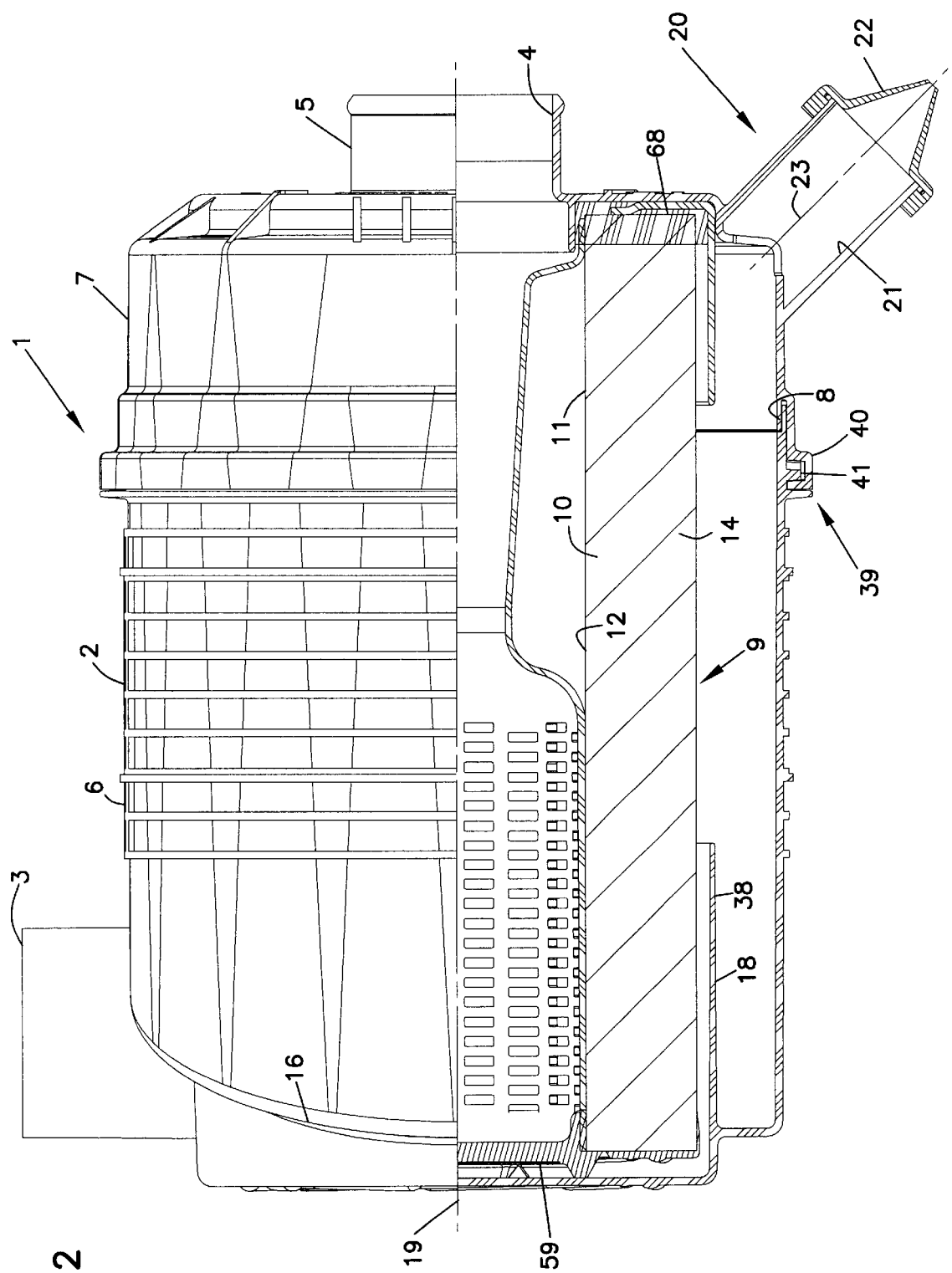
FIG. 2 is a side elevational view of the assembly shown in FIG. 1, with portions shown in cross section, to view internal detail.

Attention is first directed to FIGS. 1 and 2. In FIG. 1, reference numeral 1 indicates an air cleaner or air cleaner assembly according to the present invention. The air cleaner assembly 1 includes a housing 2, having an airflow inlet 3 and an air flow aperture 4. During use, air to be filtered passes: (a) into the housing 2 through inlet 3; (b) through a filter arrangement (see FIG. 2) positioned within the assembly 1; and (c) then the filtered air exits the air cleaner assembly 1 through the air flow aperture 4. The filtered air is then directed through appropriate conduit arrangements, not shown, to an air intake of an engine or similar arrangement. The housing 2 includes a main body member or body 6, service or and access component or cover 7. The access cover 7 is removably mounted on the main body 6. During use, the cover 7 is periodically removed for servicing.

Attention is now directed to FIG. 2 which is a side elevational view of the assembly depicted in to FIG. 1, with portions shown in cross-section for depiction of internal detail. Referring to FIG. 2, the cleaner assembly 1 includes an internally received filter media arrangement 9. The filter media arrangement 9 includes media construction 10, positioned such that, during operation, air which enters the assembly 1 through the inlet 3 passes through the media construction 10 before it can exit through air flow aperture 4; the air flow aperture 4 in the embodiment shown, being the outlet 5. For the particular arrangement shown, the media construction 10 is oriented as a cylindrical extension of media 11 defining open interior 12 and oriented to circumscribe aperture 4. The cylindrical extension of media 11 depicted is an extension of pleated media 14 similar to that described and shown in U.S. Pat. No. 5,938,804 at 25, 30 in FIG. 3. Alternate arrangements of media, including non-pleated systems for example as described in U.S. Pat. No. 5,762,669, can be utilized. Other features of the filter media arrangement 9 will be discussed herein below, in connection the description of FIG. 3.

Figure 5:
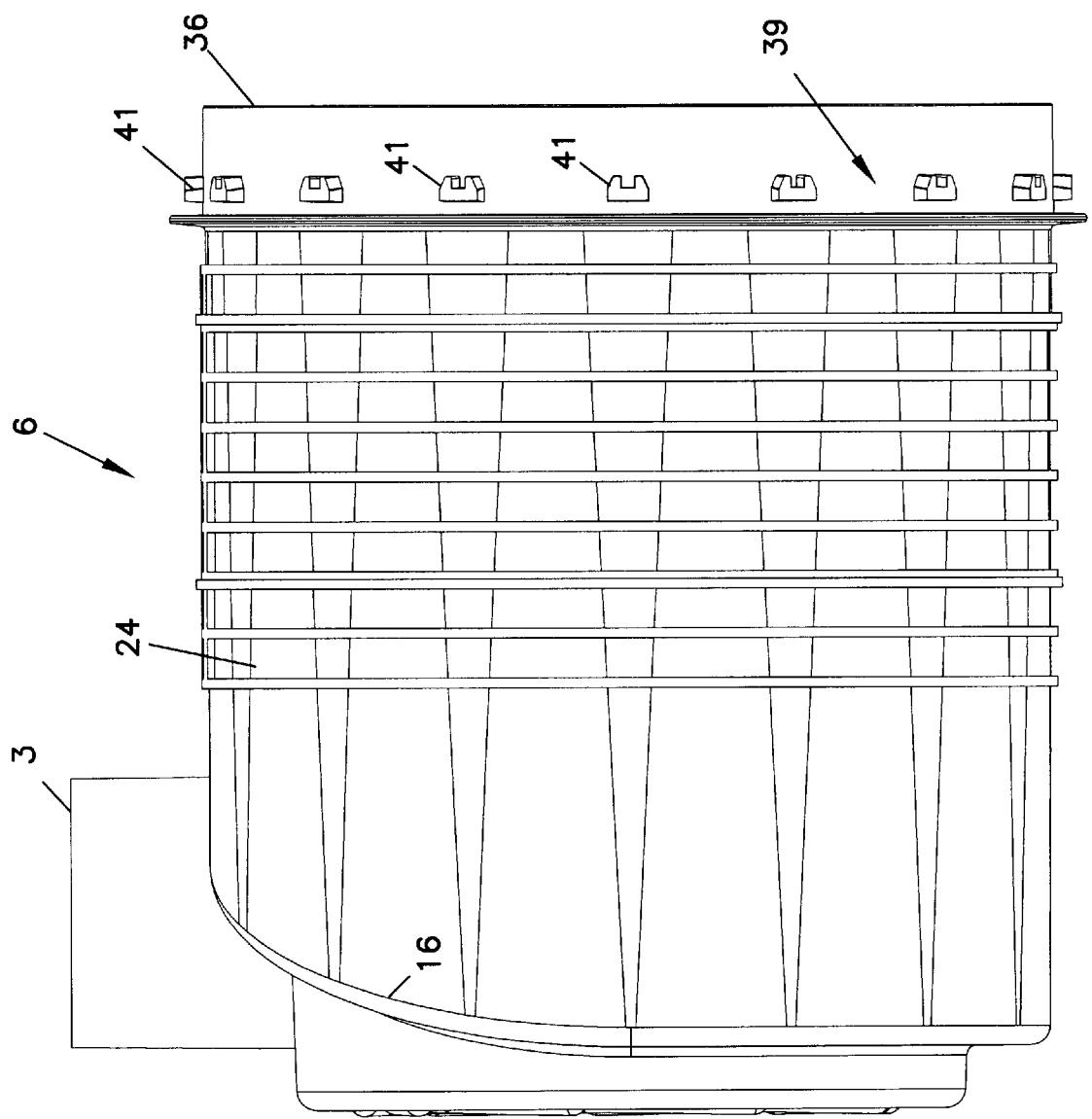
FIG. 5 is a side elevational view of a main body member component of the arrangement depicted in FIGS. 1 and 2.

Still referring to FIGS. 1 and 2, as indicated above, the cover 7 is removably mounted on the main body 6 in covering relation to open end 8 of the body 6. A variety of arrangements can be used to secure the cover 7 in place on the main body 6. A particular securing arrangement shown, is a twist or rotation lock assembly which uses a foot and holder arrangement, for example in accord with the disclosure of U.S. Pat. No. 6,051,042, incorporated herein by reference. In particular, an arrangement generally according to FIGS. 5–7, from U.S. Pat. No. 6,051,042 is depicted as utilized. It is noted, however, that a variety of alternate methods for securing the cover 7 to the main body 6 can be utilized, including over-center latch arrangements, for example such as disclosed in U.S. Pat. No. 6,022,055, incorporated herein by reference; or, plastic latch arrangements such as disclosed in U.S. Pat. No. 5,730,769, incorporated herein by reference. An advantage to the twist lock arrangement, of the type of FIGS. 5–7 of U.S. Pat. No. 6,051,042, is convenience of manufacture and ease of assembly.

Before turning to detailed discussion of the filter media arrangement 9, three additional features of the overall cleaner assembly 1 will be discussed. These are: (1) use of an inlet ramp/cyclonic or helical flow arrangement; (2) use of a dust evacuator arrangement; and, (3) use of an arrangement to facilitate mounting of the air cleaner assembly 1 onto machinery.

Referring to FIG. 1, it is noted that: the inlet 3 is oriented tangentially in the circular housing 2, and that the housing 2 includes an internal ramp 16, the external features of which are depicted in FIGS. 1 and 2. Immediately interior of where the tangential inlet communicates with the housing 2, the main body 6 includes an inlet shroud 18, FIG. 2. As a result of the shroud 18, the internal ramp 16, and the tangential orientation of the air flow inlet 3, as air enters the housing 2, the air is directed into a cyclonic or helical flow around the cylindrical extension of media 11. This type of cyclonic or helical flow arrangement has been used in plastic air cleaners before, for example the ones depicted in U.S. Pat. Nos. 6,051,042; and 5,545,241, incorporated herein by reference. The helical flow helps to settle larger particulates out of the air flow, before the air passes into the media 11.

The air cleaner assembly 1 includes evacuator valve system 20, FIG. 2, which comprises ejector tube or outlet 21 and evacuator or flap valve 22. The air cleaner assembly 1 evacuator valve system 20 is positioned on the removable cover 7. In general, particulate material that does not collect on the media 11 will move in the direction of the valve 22. The valve 22 can flap open and eject the dust to the environment. Such evacuator valve systems have been used in association with a variety of air cleaners, and the valves depicted in U.S. Pat. Nos. 6,051,042 and 5,545,241, incorporated herein by reference, can be utilized in association with the present cleaner assembly 1. It is noted that for the particular embodiment depicted in FIGS. 1 and 2, a central axis 23 of the tube 21 extends at an angle of about 45 20 relative to a central axis 19 of the air cleaner 4. Alternate configurations are usable. However, the 45° angle allows for mounting of the air cleaner 1 with the central axis 19 extending either horizontally or vertically, while still having the evacuator tube 21 pointed down.

Referring to FIG. 1, the outside surface 24 of the air cleaner assembly 1 includes mounting indents 25 thereon. These indents 25 can be used to index a mounting band and to secure the air cleaner 1 to a vehicle or other equipment on which it can be used. Such a mounting system is described, for example, in U.S. Pat. No. 5,545,241, incorporated herein by reference. The mounting band system of U.S. Pat. No. 5,545,241 can be utilized with air cleaner assemblies 1 according to the present invention, is appropriately sized.

Figure 10:
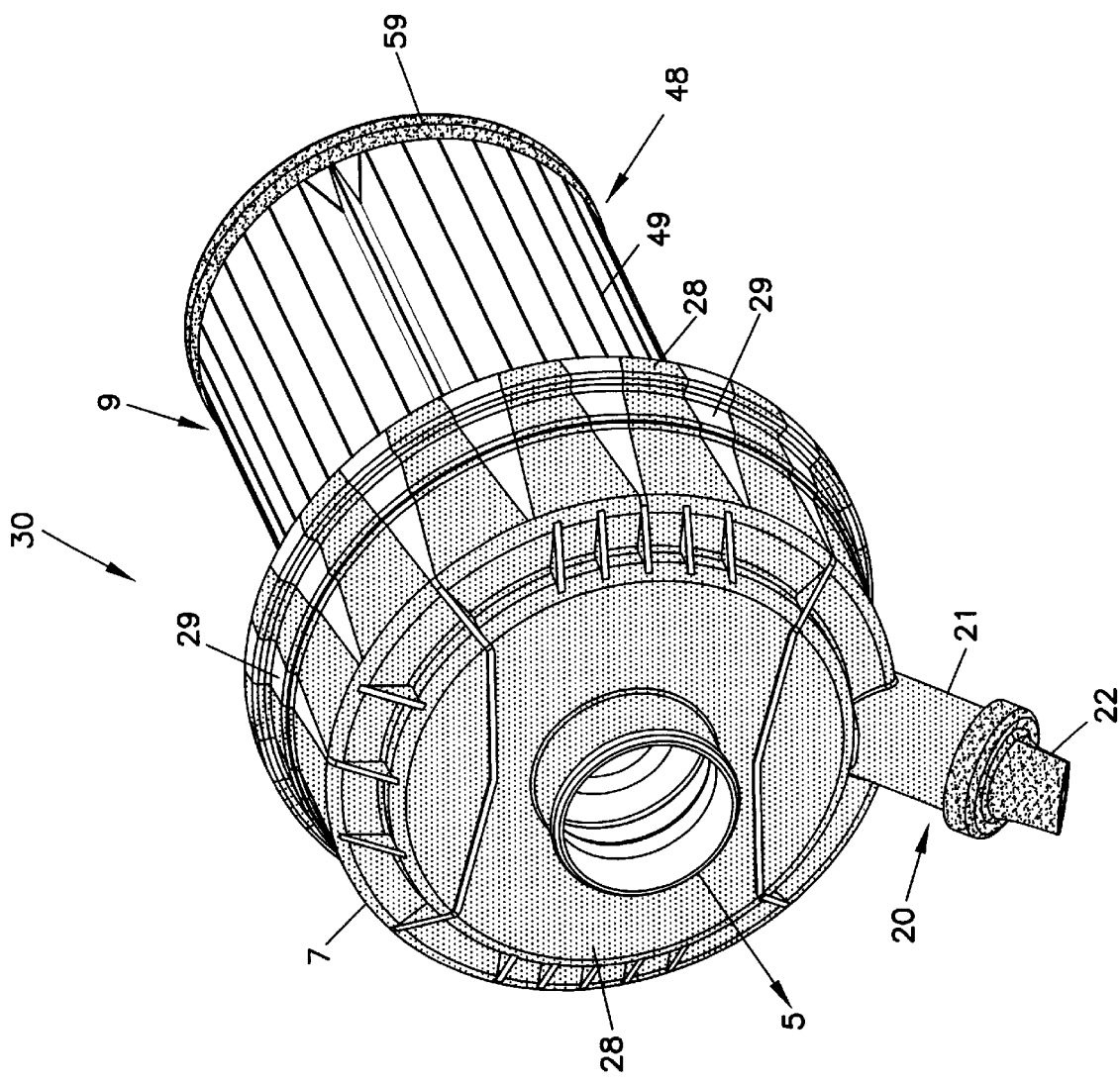
FIG. 10 is a perspective view of a preferred cover member or service part according to the present invention; and, FIG. 11 is an alternate perspective view of the service part depicted in FIG. 10.
Figure 11:
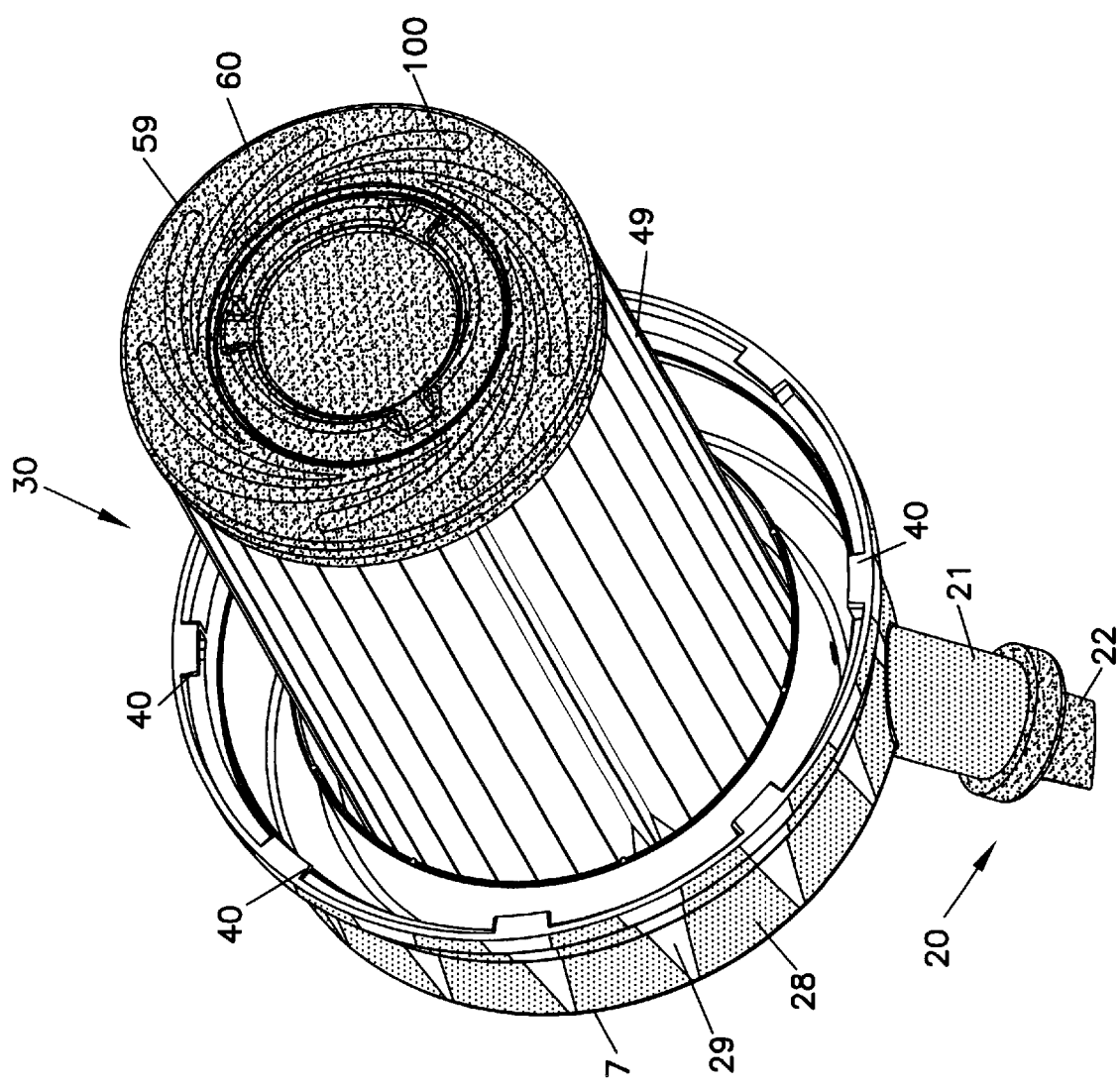

Other features on the plastic air cleaner assembly 1 provide for preferred attractive appearance, and are the subject of various simultaneously pursued design rights. In addition, such indicia as a swirl 100 (FIG. 11) can be applied to serve to indicate Donaldson Company, Inc., Bloomington, Minn. USA, the assignee of the present invention, as the source. Such a swirl is shown in U.S. Pat. No. 6,051,042, incorporated herein by reference. Other indicia such as textured surface design features 28, 29, FIG. 10 and 11, can be utilized enhance the distinctive appearance of the air cleaner.

B. The cover 7 and filter media arrangement 9

Figure 3:
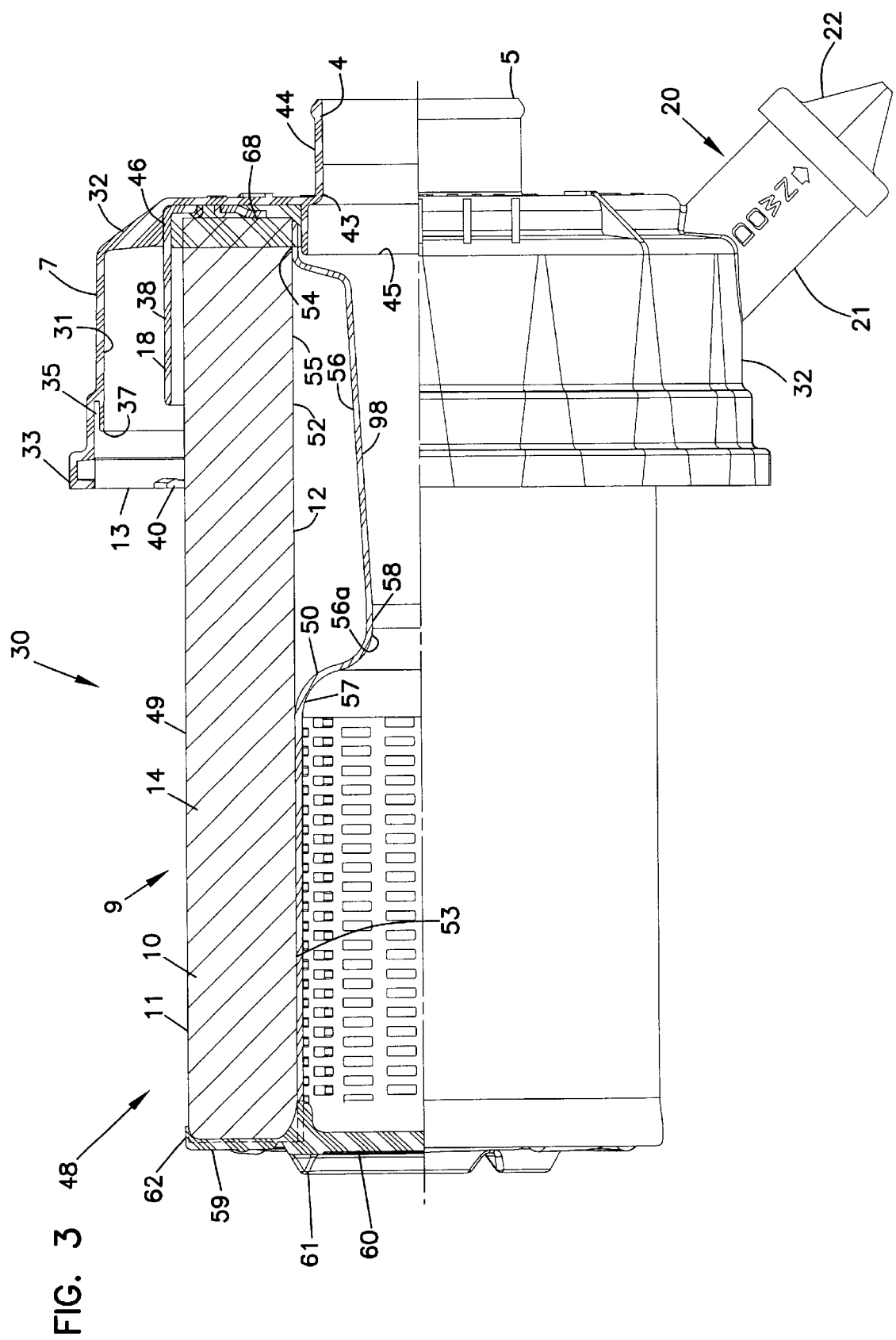
FIG. 3 is a side elevational view of a component of the arrangement shown in FIGS. 1 and 2, with a portion of the component in FIG. 3 depicted in cross section to view internal detail.

Attention is now directed to FIG. 3. In FIG. 3, a replacement part cover member (spare part) or filter element assembly 30 is depicted. The cover member or filter element assembly 30 would be periodically removed from the air cleaner assembly 1 and either be replaced by a new replacement part assembly 30, or be refurbished. Thus, the replacement part assembly 30 is a replacement part or service part; whereas the main body 6 of the housing 2 would generally left in position on the machinery or equipment involved.

The replacement part assembly 30 includes an inside 31, and preferably comprises two principal components: the cover assembly or cover 7; and, the filter media arrangement 9. In the preferred arrangement shown, the filter media arrangement 9 is nondetachably secured to the cover 7; that is, media arrangement 9 is nondetachably secured in the cover member 7 or assembly 30. By "nondetachably secured" in this context, it is meant that the filter media arrangement 9 is secured to the cover 7 in a manner such that during normal use it would not be disconnected. Indeed, for the preferred embodiment shown, an act of disconnection of the filter media arrangement 9 from the cover would generally involve or require fracture or permanent damage to a portion of the replacement part assembly 30. A preferred approach for a connection of the filter media arrangement 9 to or in the cover 7 will be described in greater detail, below.

In addition to having the filter media arrangement 9 secured thereto, the features of cover 7 are generally as follows: The cover 7 includes an outer housing wall 32 that includes a lip portion 33 which, in use, engages a portion of the main body 6, when the replacement part assembly 30 is positioned for use. The cover 7 further includes inner seal trough 35 constructed and arranged to receive an edge 36 of the main body 6 (FIG. 5) to form a dust and weather seal when the replacement part assembly 30 is positioned for use, see FIG. 2. Such a dust and weather seal is described, for example, in U.S. Pat. No. 6,051,042, incorporated herein by reference. Preferably, the seal trough 35 is 6 to 10 mm deep and its entrance 37 is set at least 10 mm from open edge 13 of the cover 7. Preferably, the main body 6 is dimensioned such that edge 36 either bottoms out in the inner seal trough 35, or extends at least 5 mm into the trough 35, when the cover member 7 is mounted on the body 6.

The replacement part assembly 30 further preferably includes inner shroud 38, which completely circumscribes the filter media arrangement 9. The preferred inner shroud 38 extends an axial distance, along the filter media arrangement 9, i.e. the direction of dimension A (FIG. 4), a distance of at least 30 mm, preferably 40 mm to 45 mm, and typically and preferably no more than about 50 mm.

Figure 6:
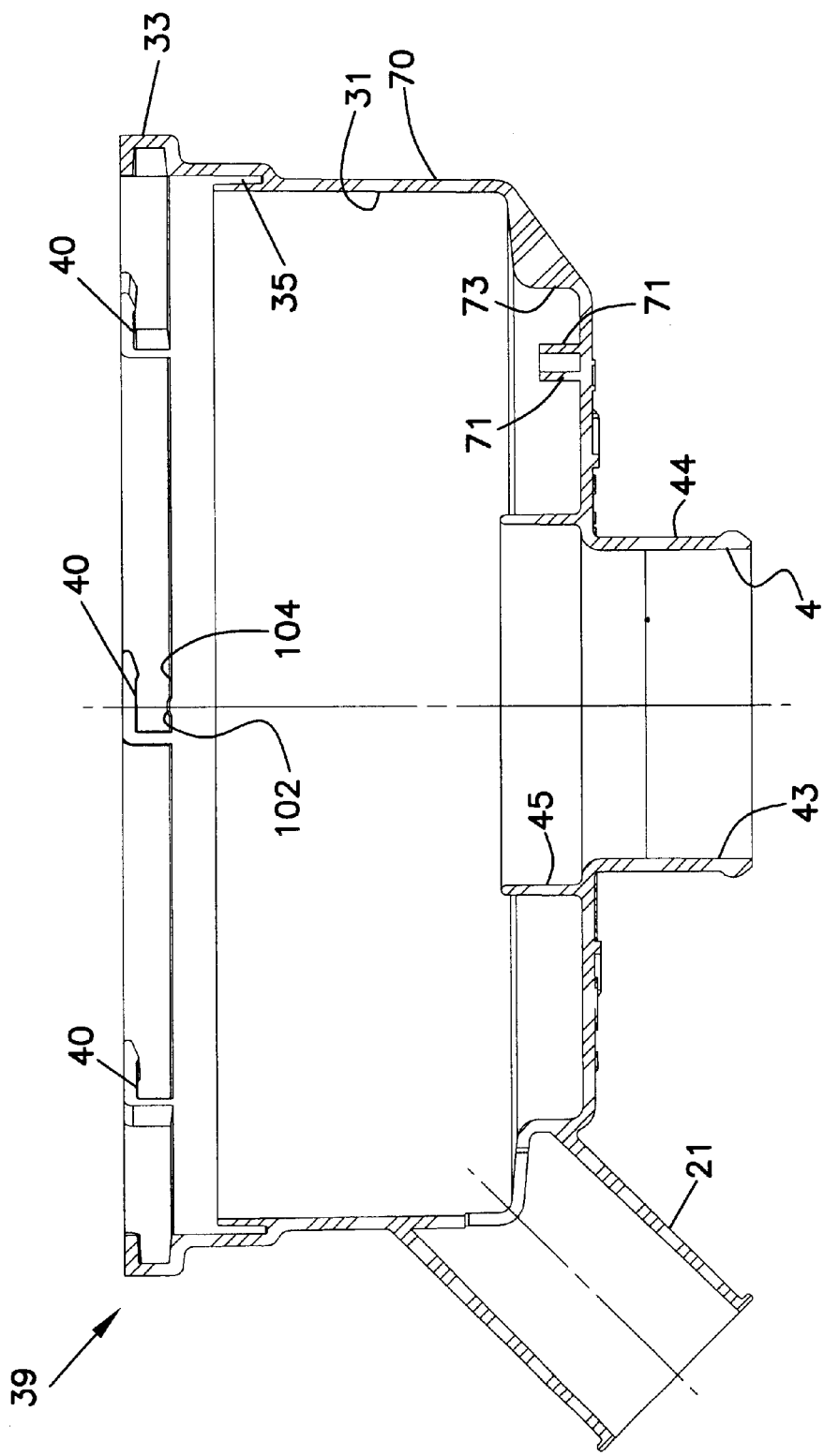
FIG. 6 is a side cross-sectional view of an outer wall member or component useable to assemble the component depicted in FIG. 3.

The cover 7, for the particular embodiment depicted, also includes a portion of a twist lock mechanism 39. In particular, for the embodiment shown a plurality of feet (for foot arrangement) 40, FIG. 6, are oriented to ensure proper connection to holders or lugs 41 on the main body 6 (FIG.

5) during twist lock mounting, again preferably in accord with the general teachings of U.S. Pat. No. 6,051,042 incorporated herein by reference. Engagement between feet 40 and lugs 41 is depicted in FIG. 2. It is noted that either the foot arrangement 40 or the holder arrangement 41 of a foot and holder arrangement can be positioned on the covers, with a companion member on the body 6. Attention is directed to FIG. 6, where it can be seen that the twist lock mechanism 39 includes at least one projection, detent, or bead 102 on a flange 104 that faces the feet 40. The detent or bead 102 is positioned to align with a corresponding recess or slot in a selected holder 41 on the main body 6. This is described in U.S. Pat. No. 6,051,042 at FIGS. 5–7, where in the '042 patent, the detent or bead is illustrated at 114 aligning with corresponding recess or slot 112. In the present disclosure, the detent or bead 102 is of a size and shape to project at least partially into the corresponding slot in the holder 41 upon locking, for frictional engagement or resistance to unlocking rotation. The preferred detent or bead 102 is illustrated as a curved bump in configuration. In the present disclosure, there is at least one detent or bead 102, no more than 5, and preferably 3 detents 102.

Upon locking the cover 7 to the body 6 with the twist lock mechanism 39, in some preferred embodiments, the filter media arrangement 9 produces a spring force that acts against the housing 2. This spring force helps to secure the twist lock mechanism 39 in its locked arrangement. The action of the spring force to help hold the locking arrangement in place is described in U.S. Pat. No. 5,755,842, herein incorporated by reference.

Also as indicated above the preferred replacement part assembly 30 includes evacuator valve system 20.

Figure 6A:
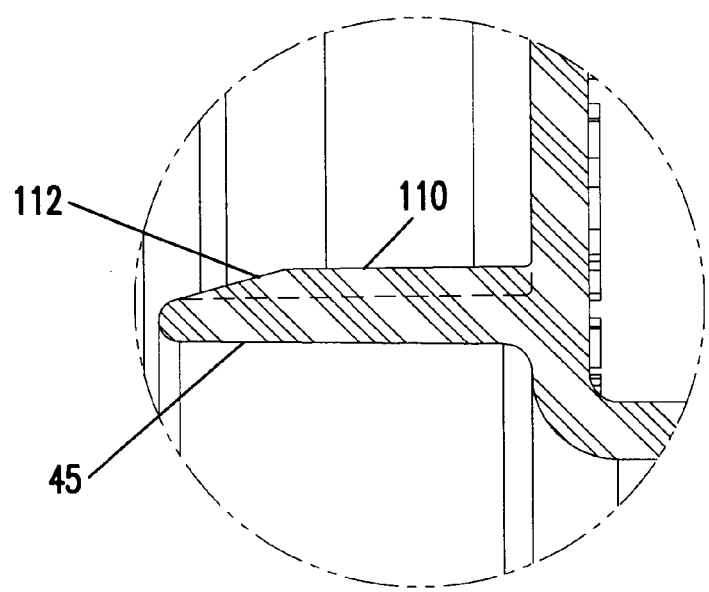
FIG. 6A is an enlarged, cross sectional view of a portion of the stump of the component depicted in FIG. 6.

Referring to FIG. 3, the preferred cover 7 also includes central air flow aperture 43 including outlet tube 44 projecting axially outwardly therefrom; and inwardly projecting central stump 45 which preferably comprises a continuous wall circumscribing aperture 43 and projecting toward the inside 31 of cover 7 by a distance of at least 8 mm, typically 8 mm to 12 mm, and preferably not more than 18 mm. The stump 45 depicted includes an optional plurality of ribs 110 (FIG. 4) projecting axially from the wall of the stump 45. Attention is directed to FIG. 6A. As can be seen, the rib 110 preferably extends the entire length of the stump 45, with an end portion having a taper 112. In preferred embodiments, there are at least two ribs 110, and preferably 4 ribs 110, evenly spaced 90° apart. During assembly, these ribs 110 are utilized to help position and center an extension of media 87 having inner support 50. This is explained further below.

The preferred cover 7 also includes a shoulder 46 in the interior that helps to support and hold the filter media arrangement 9 in the cover 7. In particular, the shoulder 46 engages an interference rib 106 (FIG. 4) on an inner potting bowl or shroud construction 75 (FIG. 7). This is described more fully below.

In general, the filter media arrangement 9 comprises a media pack 48 which includes a region of filter media 49 positioned to circumscribe an inner support 50. For the particular arrangement depicted, the region of filter media 49 comprises a cylindrical extension of pleated filter media 14, defining open interior 12. The inner support 50 is positioned to have at least a portion thereof support the innermost edge 52 of the region of filter media 49. For the particular arrangement depicted, the support occurs in two spaced regions 53 and 54, preferably with an extension 55 of unsupported media extending therebetween, over a distance of at least 60 mm, typically 80 mm–100 mm.

Figure 9:
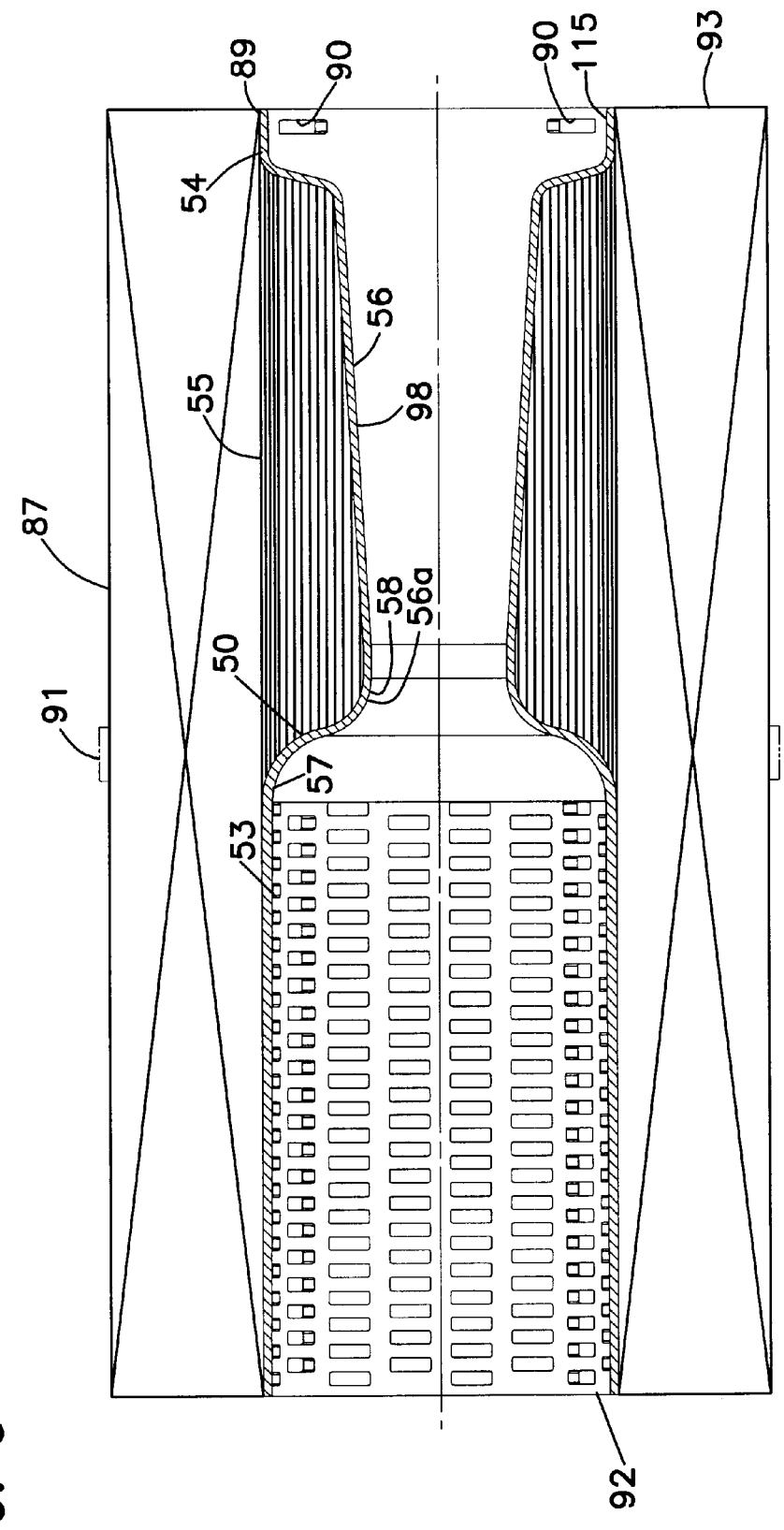
FIG. 9 is a cross-sectional view of a media construction comprising a combination of a support and filter media, usable in the formation of the filter element component depicted in FIG. 3.

For the particular arrangement depicted, the inner support 50 comprises a noise suppressing or resonator element 56, FIG. 9, which includes certain features generally in accord with those of the noise suppressing element depicted in U.S. Pat. No. 5,112,372, the complete disclosure of which is incorporated herein by reference. In general, the noise suppressing element 56 includes a sonic choke 56a. The sonic choke 56a includes a bell section 57, a throat 58, and a diverging wall section 98. The bell section 57 has a cross sectional area greater than that of the throat 58. The diverging wall section 98 gradually increases its cross sectional area from the throat 58 to the vicinity adjacent to the outlet 5, i.e. region 54, to provide a noise attenuator arrangement. The noise suppressing element 56 of the current assembly 1 does differ from the arrangement of U.S. Pat. No. 5,112,372, with respect to the specific features which relate to how the element 56 engages with the media 49 and also how it engages with the remainder of the air cleaner assembly 1. Detail with respect to the features that concern these portions of the noise suppressing element 56 are provided below, in connection with the assembly description.

Referring to FIG. 3, the filter arrangement 9 also includes closed end cap 59. Features of the closed end cap 59 include outer axial surface 60 having raised bumps or compression bumps 61 thereon; and, outer annular rim 62. Preferably, end cap 59 comprises urethane. In particular, the end cap 59 comprises a soft urethane foam having an "as molded" density of 14–22 lbs/ft. Many formulations and types of material are usable. One example formulation is the following: The polyurethane comprises a material made with Elastofoam® ( 36070R Resin and Elastofoam® 13050U isocyanate, which is sold exclusively to the assignee Donaldson by BASF Corporation, Wyandotte, Mich. 48192.

The materials should be mixed in a mix ratio of 100 parts Elastofoam® 36070R Resin to 45.5 parts Elastofoam® 13050U isocyanate (by weight). The specific gravity of the resin is 1.04 (8.7 lbs/gallon) and for the isocyanate it is 1.20 (10 lbs/gallon). The materials are typically mixed with a high shear dynamic mixer. The component temperatures should be 70–95° F. The mold temperatures should be 115–135° F.

The resin material has the following description:
(a) Average molecular weight
  1) Base polyether polyol=500–15,000
  2) Diols=60–10,000
  3) Triols=500–15,000
(b) Average functionality
  1) total system=1.5–3.2
(c) Hydroxyl number
  1) total systems=100–300
(d) Catalysts
  1) amine=Air Products 0.1–3.0 PPH
(e) Surfactants
  1) total system=0.1–2.0 PPH
(f) Water
  1) total system=0.03–3.0 PPH
(g) Pigments/dyes
  1) total system=1–5% carbon black
The 13050U isocyanate description is as follows:
(a) NCO content—22.4–23.4 wt %
(b) Viscosity, cps at 25° C.=600–800
(c) Density=1.20 g/cm$^3$ at 25° C.
(d) Initial boiling pt.—190° C. at 5 mm Hg
(e) Vapor pressure=0.0002 Hg at 25° C.

(f) Appearance—colorless liquid (g) Flash point (Densky-Martins closed cup)=200° C.

The polyurethane should be cured for 72 hours at 65–85° F. (18–9° C.) or force cured for 5 hours at 190+/−1.8° F. (88+/−1° C.). At least 30 minutes to recover should be allowed. The compression deflection should have a 25% deflection at room temperature (70° F.) of an average 10+4/−3 lbs. per square inch (69+27/−21 kPa). After heat aging 7 days at 158+/−1.8° F., there should be +/−20% change from the original deflection values and allowing at least 16 but not more than 96 hours to recover. At cold temperatures (−40° F.), there should be 100 pounds. per square inch (689 kPa) maximum average. For the compression set, the polyurethane should meet the maximum averages of the following after heat aging 22 hours at the temperatures specified at 50% deflection: After heat aging 22 hours at 158+/−1.8° F., 10% maximum; after heat aging 22 hours at 180°+/−1.8° F., 25% maximum. The tensile strength should be 100 psi (620 kPa) minimum average. Elongation should be 200% minimum average. The tear strength should be 15 lb/in. minimum.

Also, in preferred arrangements, the filter arrangement 9 includes no outer liner.

C. Manufacture and assembly of a preferred assembly 1

The preferred assembly 1 can be manufactured to be completely metal free. In such an application, the preferred assembly 1 the main body 6 would comprise a molded plastic component, preferably a component molded from polypropylene, for example glass reinforced polypropylene, by injection molding. Such a part can be made to be durable, lightweight and relatively inexpensive, using commercially available glass reinforced polypropylenes. Various housing features for the preferred arrangement depicted in FIGS. 1, 2 and 5, can be readily formed through such techniques.

The replacement part assembly 30, on the other hand, for typical, preferred embodiments, has a composite construction. For example, and referring to FIG. 3, the outer wall 32 of the cover 7 would preferably be an injection molded component of a similar or identical plastic as that used for the main body 6. The shroud 38, on the other hand, would preferably comprise an ABS plastic (i.e. an acrylonitrile-butadiene-styrene polymer) manufactured by injection molding. An advantage to this type of system is that it facilitates having the shroud 38 secured to a potting material, during assembly, as described below.

A preferred potting material for replacement part arrangements 30 according to the present invention will be one which adheres or secures well to ABS material, but not necessarily polypropylene material. By using the assembly described, a relatively inexpensive polypropylene material can be used for the majority of the cover 7, i.e. the outer housing wall 32, while at the same time a more expensive ABS material can be used for the shroud 38, where potting adherence is more important.

In general, the evacuator valve 22 will comprise a rubber like material, for example neoprene rubber; and, the inner support 50, FIG. 3, will comprise a polypropylene plastic (not reinforced). As indicated previously, the end cap 59 will preferably comprise soft, compressible, comprise urethane. Typically, the media 11 will be a pleated media comprising cellulose fibers or a composite of cellulose and synthetic fibers or even a complete synthetic fiber systems, with the potting material 68, FIGS. 3 and 4, preferably comprising a hard urethane, for example, urethane having a durometer of at least 30 Shore D. One type of usable urethane includes BASF WUC 36082 resin and I-3050 isocyanate. If synthetic fibers are used for the media 11, typically polyester fibers will be chosen.

Assembly will be apparent from a review of FIGS. 6–9.

Referring first to FIG. 6, a premade or preformed outer wall construction 70, which would eventually form the housing wall 32 in the completed cover 7, is depicted. By "preformed" or "premade" it this context, it is meant that the part 70 would be created prior to use to create (by assembly) the remainder of the replacement part 70. Besides features generally as described above, the outer wall construction 70 includes heat stakes therein, an example of one being depicted at 71. Heat stakes 71 provide for engagement with another component, as described below. It is anticipated that generally the outer wall construction 70 would include at least two and typically three or four heat stakes 71 positioned, radially spaced, about central axis 72, with each being positioned to extend generally parallel to axis 72 and extending inwardly from wall section 73 a distance of at least 4 mm, typically 5 to 8 mm, and preferably not more than 9 mm. Operation of the heat stakes will be described further below. A typical heat stake would have an OD of about 6 mm and an ID of about 3 mm.

A second preformed component usable in generating preferred replacement parts 30 in arrangements according to the present invention is depicted in FIG. 7 at reference numeral 75, and comprises the inner potting bowl or shroud construction. The inner potting bowl 75 includes base 76 and outer wall or shroud 77. The outer wall or shroud 77, in the completed arrangement, forms inner shroud 38 (FIGS. 2, 3). The inner potting bowl 75 also includes a central base aperture 78, which is sized to circumscribe inner airflow stump 45 of outer wall construction 70, during assembly. Further, the present inner potting bowl 75 includes radially spaced apertures 81 sized and positioned to fit over the heat stakes 71, during assembly.

Figure 7:
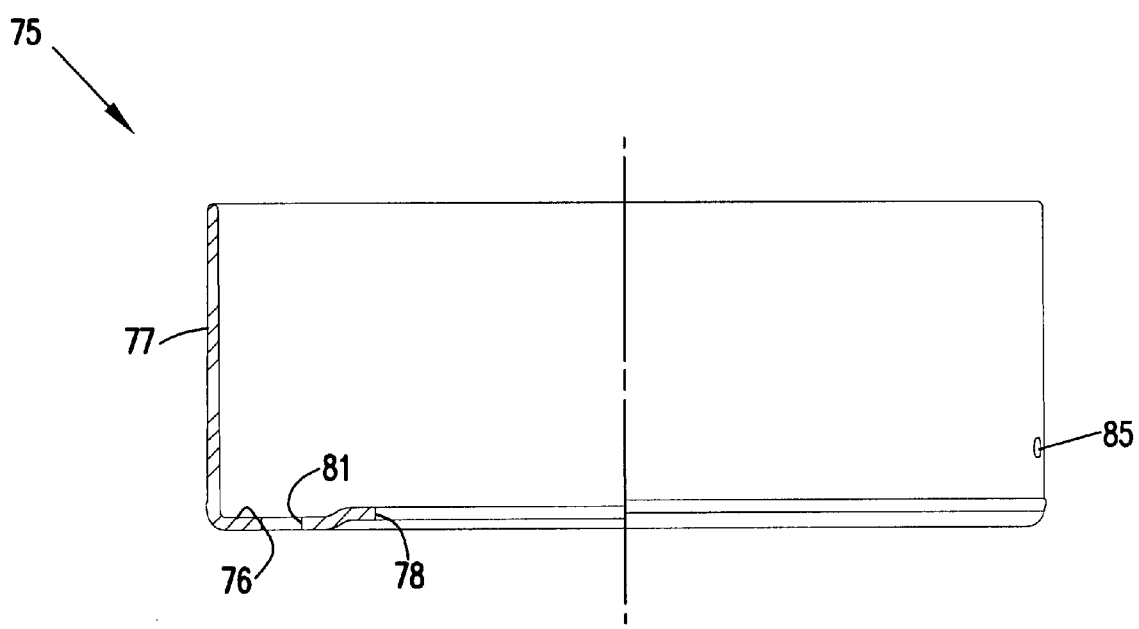
FIG. 7 is a side elevational view of a shroud member or component useable to assemble the component of FIG. 3.
Figure 8:
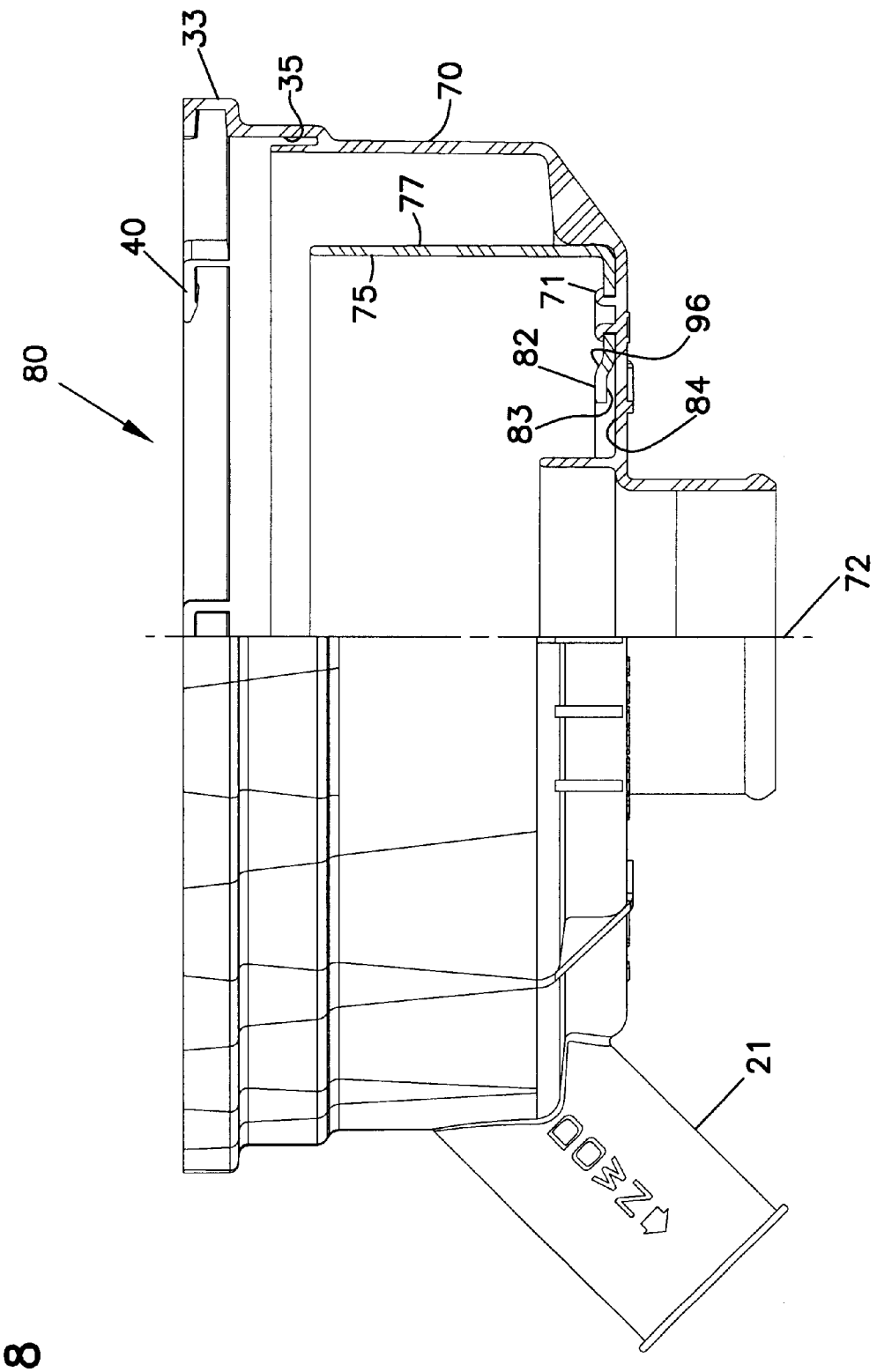
FIG. 8 is a side elevational view of a combination component formed by combining the components depicted in FIGS. 6 and 7, during a step of preparing the component depicted in FIG. 3 via a preferred process.

During construction, the preformed parts 70 and 75 are nested as indicated in FIG. 8, to form an assembly 80. In general, the inner potting bowl 75 is secured in position, by deforming the heat stakes 71, for example by heat deformation with a heated element. From FIG. 8 it can be seen that potting bowl 75 includes inner rim 82 circumscribing central base aperture 78 which projects axially inwardly to create space 83 between rim 82 and outer wall section 84. The shroud 77 also includes at least one radial, water drain aperture 85 (FIG. 7) therein to allow water to drain out from inside the shroud, should any collect during use. In preferred constructions, the heat stake 71 in the outer wall construction 70 (FIG. 6) are unevenly spaced, to ensure a single orientation of the potting bowl 75 relative to the evacuation valve 20. It is preferred that the water drain aperture 85 be orientated relative to the evacuation valve 20 so that as liquid drains from inside of the shroud 77, it is drained by gravity and allowed to drip into the evacuation valve 20. By having the stakes 71 positioned unevenly, they will only be able to nest with the apertures 81 in the preformed part 75 in a single orientation. In this way, it will be ensured that the water drain aperture 85 is in the correct, adjacent orientation relative to the evacuation valve 20, an outer wall of it being shown at 21 in FIGS. 6 and 8.

Figure 7A:
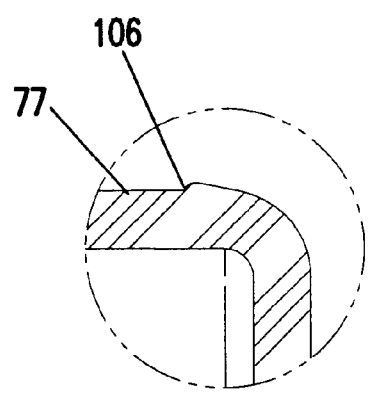
FIG. 7A is an enlarged, cross sectional view of a fragment of the shroud member depicted in FIG. 7.

Further, attention is directed to FIG. 7A. The outer wall or shroud 77 of the bowl 75 is depicted in cross-section and enlarged. It can be seen that there is a projection or rib at 106 extending or projecting from remaining portions of the outer wall or shroud 77. This projection 106 engages the shoulder 46 of the cover 7 in an interference fit (see FIG. 4). The material in the shoulder 46 deforms in order to accommodate the flange, rib, or projection 106. This engagement provides another seal region 108 (FIG. 4), to help ensure that no dirty air is allowed to pass the outlet tube without first passing through the filter media 14.

Attention is now directed to FIG. 9. FIG. 9 depicts a cylindrical extension of media 87 (which forms media extension 11 in the final assembly 1) mounted on inner support 50, for assembly. The inner support 50 includes an end section 89 with radial resin flow apertures 90 radially positioned thereon. (Such an end section 89 is a feature not found in the inner support of the arrangement depicted in U.S. Pat. No. 5,112,372). The preferred end section 89 depicted provides several functions. First, the end section has an outer diameter sufficiently large so as to support media extension 87 and directly contact therewith. Secondly, the radial flow apertures 90 allow for flow of potting resin material radially through end 89, during assembly, as described below. Also, the inner diameter of the end section 89 is sufficiently large to allow the arrangement to fit over stump 45 during assembly. Preferably, the relative sizes of the stump 45 and the end section 89 are such that the end section 89 can slightly engage the stump 45, without significant pressure being needed for assembly.

It is noted that, during an assembly operation, a removable securing band may be used to secure the extension of media 87 around the inner support 50, since no outer media support is provided in the preferred assembly. For example a rubber band depicted in phantom at 91 (FIG. 9) could be used for this purpose, with the rubber band being removed after a later assembly step.

During a process of assembly, each of the following two steps is conducted:

(1) The closed end cap 59 is molded onto end 92 of the media 87 and support 50; and, (2) The end 93 of the cylindrical extension of media 87 and support 50 is potted to the assembly 80, FIG. 8.

The particular order of these two steps is not critical. For purposes of the following discussion, it will be assumed that the first step conducted is providing the closed end cap 59.

The closed end cap 59 can be molded through conventional techniques. In general, this will be conducted by positioning end 92 in a mold having uncured end cap material therein, and allowing molding operation and cure to occur. Usable materials for the end cap include, for example, soft urethane foam as described above. Of course, alternative end cap materials and configurations can be used.

Figure 4:
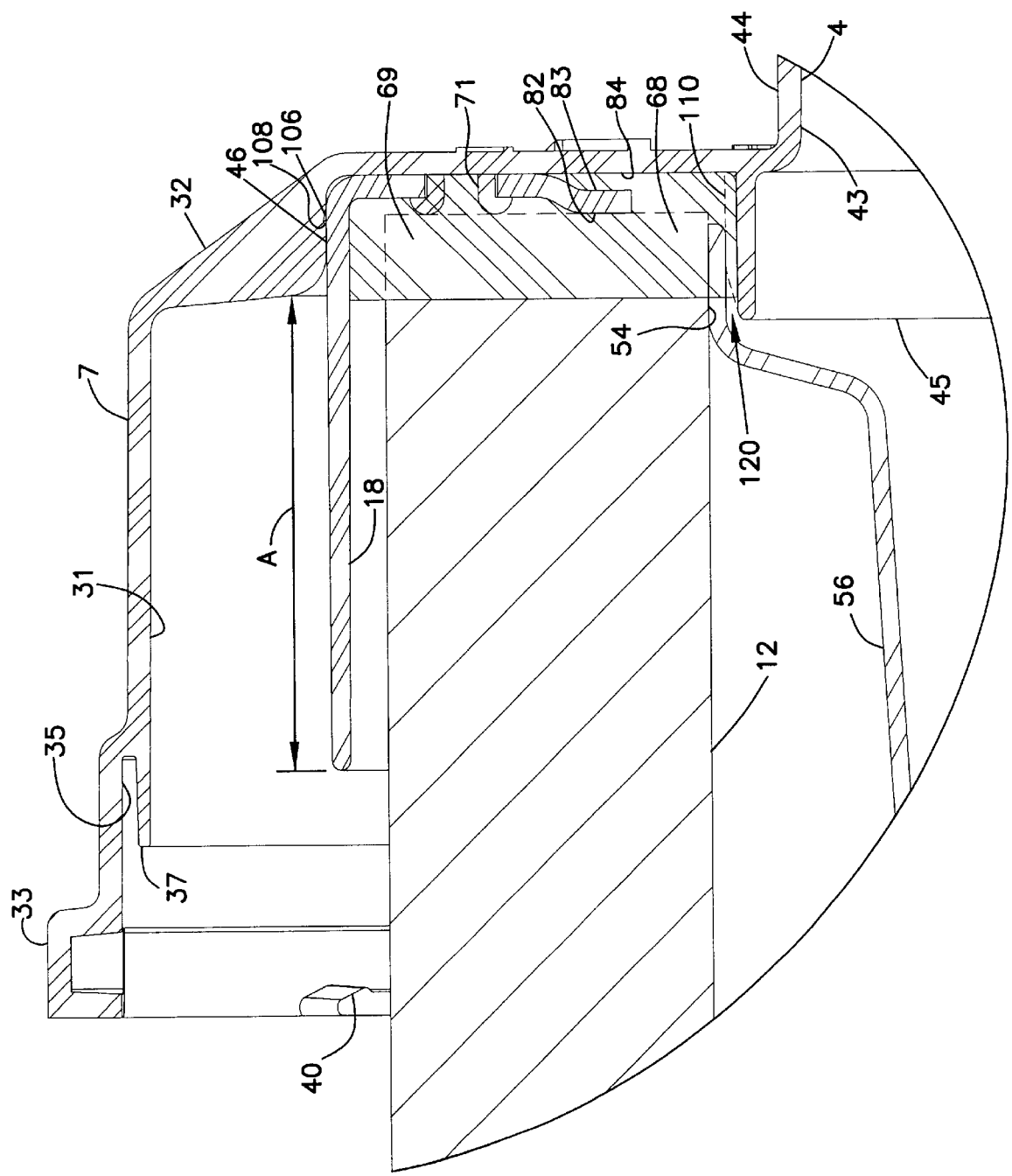
FIG. 4 is an enlarged fragmentary cross sectional view of a portion of the component depicted in FIG. 3.

A unique potting operation is utilized to secure end 93 to assembly 80. For this to occur, the end 93 is positioned over stump 45 and into region 96, FIG. 8. In particular, the aperture 115 defined by the support 50, is guided and centered over the stump 45, with the aid of ribs 110 (FIG. 6A). The slopped or angled taper 112 helps to guide the extension of media 87 over the stump 45. Once the extension of media 87 is in position, the ribs 110 help to hold the extension of media 87 away from the stump 45 to allow the resin to flow in between the extension of media 87 and the support 50 to obtain a good, secure bond. In FIG. 4, the rib 110 is depicted in phantom, and is generally optional. Typically prior to this operation, an onset potting resin will have been placed within region 96 to an appropriate depth. The resin would be contained within region 96 by bowl 75 and stump 45. It will also have flowed into space 83. When the insertion of end 93 occurs, the material also will flow into the media 11 and between the pleats; and through apertures 90 in section 89. The result, after the potting material hardens, is an end cap/cover composite 69 and is depicted in FIG. 3 and 4, and is a secure connection of the various components together, into a permanent or nondetachable relationship.

The secure connection forms a permanent, nondetachable seal 120 (FIG. 4) between the stump 45 of the outlet tube 44 and the media 87; and between the end region 96 of the assembly 80 and the media 87. This arrangement can be advantageous, in that by the permanent, nondetachable seal 120, the integrity of the seal 120 is maintained. There is no requirement for the user to properly mount the media on the outlet tube to form the seal (as in some prior art arrangements).

After this assembly, or before if desired, the valve 22 can be inserted on outlet 21, and the cover assembly 7 is ready to be positioned on body 6, for air cleaner use.

Periodically, as the media arrangement 10 becomes worn, damaged or occluded, cover assembly 7 can be readily replaced by another replacement cover assembly. It is anticipated that such replacement would be by a replacement part assembly 30 similar or identical in construction to the one removed.

It will be understood that during servicing of an air cleaner including a replacement part according to the principles described herein, at no time is a seal broken between the clean air side of the filter media arrangement 9, and any portion of the air cleaner housing 2. Rather, the media construction is non-detachably secured in the housing cover 7, and the seal is maintained throughout life. Thus, with preferred arrangements according to the present disclosure there need be no special measures taken to ensure a removable and reestablishable seal between the air filter media and the air cleaner. This is advantageous since it ensures a more secure sealed system, in a relatively convenient and inexpensive manner.

The above specification and examples provide an appropriate description: of the manufacture and use of the composition of the invention. Many embodiments of the invention can be made without departing from the spirit and scope of this disclosure.

What is claimed is:

1. A cover member for removable attachment to an open end of an air cleaner body; the cover member comprising:

(a) an outer wall having an air flow aperture therethrough; and, (b) a media construction positioned to circumscribe said air flow aperture;

(i) the media construction being nondetachably secured in the cover member.

2. A cover member according to claim 1 including:

(a) a dust evacuator arrangement including a dust evacuator tube projecting outwardly from the cover member outer wall;

(i) the dust evacuator arrangement including an evacuator valve positioned on an end thereof.

3. A cover member according to claim 2 wherein:

(a) said media construction includes a cylindrical extension of media; and (b) said cover member includes a cylindrical shroud oriented to extend an axial distance of at least 30 mm along said extension as media;

(i) said cylindrical shroud circumscribing said extension of media and being spaced therefrom.

4. A cover member according to claim 3 wherein:

(a) said cover member includes an inner support circumscribed by said cylindrical extension of media;

(i) said inner support comprising a resonator tube including a sonic choke therein.

5. A cover member according to claim 4 wherein:

(a) said cylindrical extension of media is nondetachably secured within said cover member by a polymeric potting material.

6. A cover member according to claim 5 wherein:
(a) said media construction has a closed end cap of polymeric material positioned over an end of said media construction remote from said air flow aperture in said cover outer wall.

7. A cover member according to claim 6 wherein:
(a) said media construction has no outer liner.

8. A cover member according to claim 6 wherein:
(a) said media construction comprises pleated media.

9. A cover member according to claim 8 wherein:
(a) said cover member includes a dust and weather seal trough therein, sized and positioned to receive an edge of the air cleaner body therein, when said cover member is mounted on the air cleaner body.

10. A cover member according to claim 8 including:
(a) a first member of a foot and holder twist lock arrangement thereon, for rotatably securing said cover member onto the air cleaner body.

11. A cover member according to claim 1 further comprising:
(a) a preformed outer wall member; and,
(b) a preformed shroud member secured to the preformed outer wall member.

12. A cover member according to claim 11 wherein:
(a) said cover member comprises a cover member formed from a process including a step of preliminarily securing the preformed shroud member to the preformed outer wall member, by a step of deforming a heat stake arrangement on the outer wall member.

13. A cover member according to claim 12 wherein:
(a) said cover member further comprises a cover member formed from a process including a step of potting the media construction, with a resin potting compound to a preformed combination resulting from the step of preliminarily securing the preformed shroud member to the preformed outer wall member.

14. A cover member according to claim 13 wherein:
(a) the preformed shroud member includes an end wall with a central aperture therein; the central aperture of the preformed shroud member being circumscribed by a recessed wall portion oriented to provide a potting resin flow space between the portions of preformed shroud member and the preformed outer wall member during assembly.

15. A cover member according to claim 14 wherein:
(a) said media pack includes an inner support having an end with a radial resin flow aperture arrangement therein;
  (i) said step of potting the media construction, to the preformed shroud member and the preformed outer wall member, includes providing potting resin flow through the radial resin flow aperture arrangement.

16. A cover member according to claim 15 wherein:
(a) the inner support comprises a polypropylene plastic.

17. A cover member according to claim 16 wherein:
(a) the inner support comprises a resonator tube including a sonic choke.

18. A cover member according to claim 17 wherein:
(a) said preformed outer wall member comprises a polypropylene plastic; and
(b) said preformed shroud member comprises an ABS plastic.

19. A cover member according to claim 18 wherein:
(a) said resin potting resin comprises a polyurethane resin.

20. An air cleaner comprising:
(a) an air cleaner body including an air flow inlet; said air cleaner body having an open end; and,
(b) a cover member removably mounted on, and in covering relation to, said open end of air cleaner body; said cover member comprising:
  (i) an outer wall having an air flow outlet aperture there through;
  (ii) a media construction positioned to circumscribe said air flow outlet aperture;
    (a) said media construction being nondetachably secured to said cover member.

* * * * *

UNITED STATES PATENT AND TRADEMARK OFFICE
CERTIFICATE OF CORRECTION

PATENT NO.   : 6,419,718 B1
DATED        : July 16, 2002
INVENTOR(S)  : Klug et al.

It is certified that error appears in the above-identified patent and that said Letters Patent is hereby corrected as shown below:

Column 3,
Line 53, delete "4520" and insert -- 45º --

Signed and Sealed this

Fourth Day of February, 2003

JAMES E. ROGAN
*Director of the United States Patent and Trademark Office*